United States Patent [19]
Galler

[11] 3,832,691
[45] Aug. 27, 1974

[54] ELECTRIC MODEL MOTOR CONTROL
[76] Inventor: Frank A. Galler, P.O. Box 87, South Walpole, Mass. 02081
[22] Filed: June 20, 1973
[21] Appl. No.: 371,856

[52] U.S. Cl................. 340/171 R, 318/16, 343/225
[51] Int. Cl. ............................................. H04b 7/00
[58] Field of Search................. 340/171 R; 343/225; 318/16

[56] References Cited
UNITED STATES PATENTS
3,029,371   4/1962   Saito ............................. 343/225 X
3,199,005   8/1965   Ashworth............................ 318/16

Primary Examiner—Donald J. Yusko
Attorney, Agent, or Firm—Thomas N. Tarrant

[57] ABSTRACT

A motor control for connecting an energy source to an electric power motor of a model in which the on and off operation of said power motor is effected by electrically activatable switching responsive to a radio signal and a voltage sensing circuit which opens the circuit automatically when the voltage of the energy source drops below a predetermined level.

In one particular utilization two switches actuated by extreme operation of an independent radio controlled element such as an airplane rudder provide on-off control operation of the propeller drive motor.

7 Claims, 1 Drawing Figure

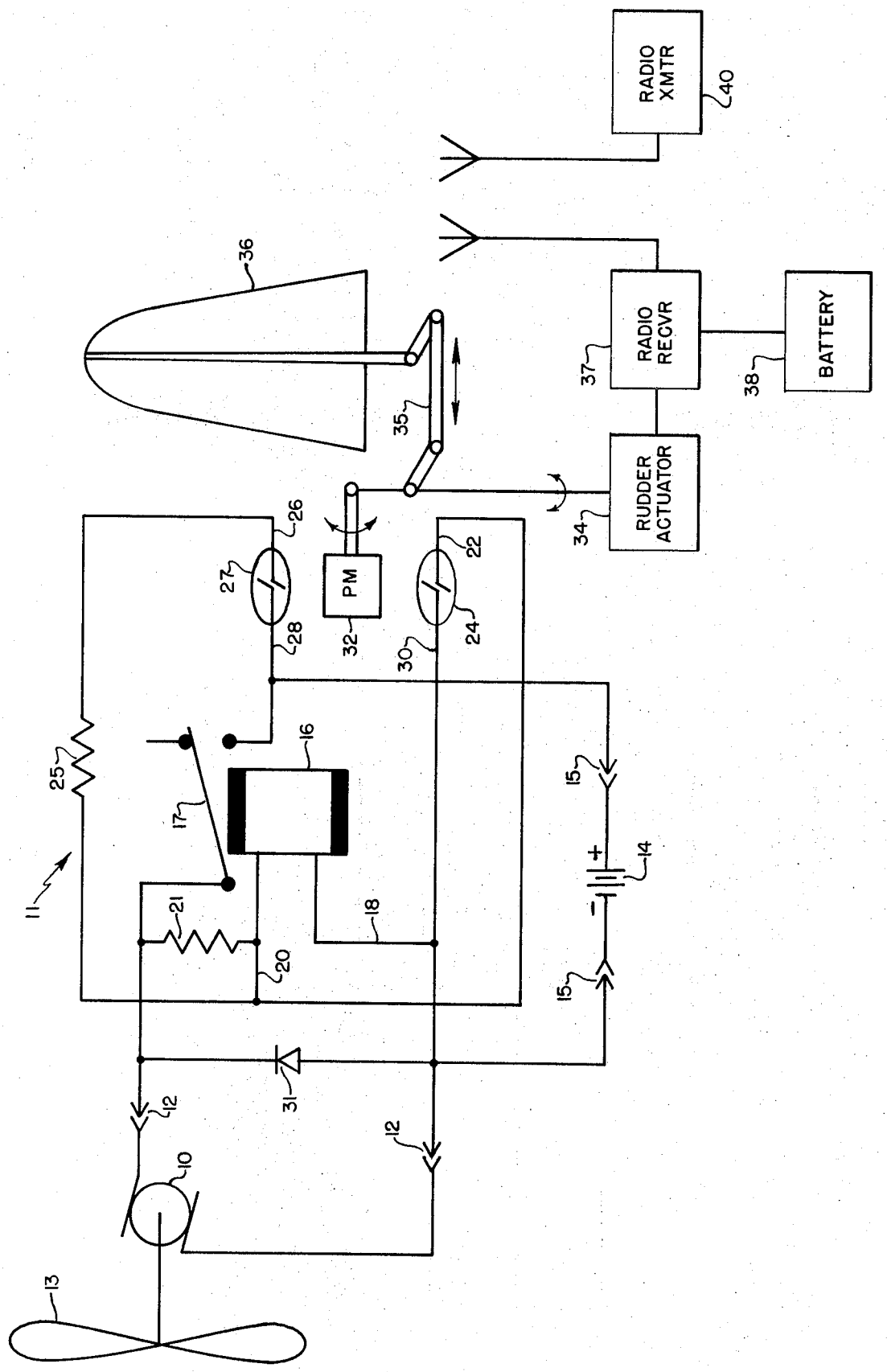

3,832,691

ELECTRIC MODEL MOTOR CONTROL

BACKGROUND OF THE INVENTION

1. Field of the Invention

The present invention relates to electrical motor controllers for electric models and particularly to such models which are radio controlled.

2. Relation to the Prior Art

Radio controlled models including boats, cars, and airplanes are seen in increasing numbers. While cars and boats have been common both with electric and internal combustion engine power, model aircraft have until recently used internal combustion power predominately. In recent years, battery development has produced rechargable batteries of greatly improved energy to weight ratios. As a result, electrically driven radio controlled model aircraft are appearing on the scene in increasing numbers.

Internal combustion engine powered model planes, even radio controlled ones, often have no on-off operation of the motors and are simly run until the fuel is dissipated. With the batteries most suitable for electrically driven model airplanes such as nickel cadmium cells, excessive discharge is harmful to the battery. Thus, it is desirable to have a controller both for on-off operation of the driving motor and for protection of the battery from excessive discharge.

In radio controlled models, the cost of the radio equipment and the radio activated actuators is very substantial, and it is necessary to keep these as simple as is reasonably possible for economic reasons. Thus, for example, U.S. Pat. No. 3,683,546 to Congdon discloses a remote control system for a model car in which the same radio control actuator controls both steering and throttle operating to slow the driving motor down when the model car is turning. Since these two operations are both continually variable between limits, the utilization of the same actuator is fairly simple. In all radio controlled models, means are usually provided for steering. On and off operation of the driving motor is usually performed by a separate actuating device operated either through a separate radio channel or some means of modulation and decoding with only one channel.

SUMMARY OF THE INVENTION

In accordance with the present invention an electric motor controller for models is provided which turns a motor on and off in response to a radio signal and a voltage sensing circuit also turns the motor off when the battery is low.

In a preferred embodiment of the invention, the motor controller is activated by operation of magnetic reed switches responsive to extreme positions of a magnet moving on the steering mechanism. Switches of this type have the value of being extremely light in weight and producing extremely small energy drain on the steering actuation. An impedance to provide holding current for the control is responsive to drop in battery voltage for opening the circuit. Thus, it is an object of the invention to provide an on-off motor controller for electrical models.

It is a further object of the invention to provide an on-off motor controller for an electrically driven model aircraft.

It is still a further object of the invention to provide a motor controller in which on-off control of the driving motor is derived from extreme positions of a radio controlled steering actuator.

It is still a further object of the invention to provide an on-off motor control for electrically driven models responsive to decay in battery voltage to disconnect the battery.

Further objects and features of the invention will become obvious upon reading the following description together with the drawing.

BRIEF DESCRIPTION OF THE DRAWING

The FIGURE is a schematic diagram partially in block form of a preferred embodiment of the invention.

DESCRIPTION OF THE PREFERRED EMBODIMENT

A schematic diagram of the inventive controller is illustrated in FIG. 1 together with diagramatic and block illustration of the related component parts of a model airplane to show a preferred embodiment and utilization. The inventive controller is particularly suitable for use in model aircraft due to its compact size and light weight. Since model aircraft have no particular requirement for motor speed control, the present invention permits on-off motor control and rudder actuation with only the remote radio operation necessary for actuating the rudder alone. In FIG. 1 the propeller driving electric motor is depicted as motor 10 connected to motor controller 11 through connectors 12. Battery 14, also carried by the model airplane, is depicted as connected to the motor controller by connectors 15. Connectors 12 and 15 provide the means for connecting and disconnecting the battery and the propeller motor from motor controller 11 and are depicted to help define controller 11 separately. For simplicity, reference to these connections will be omitted in the following description. Motor 10 and battery 14 will be described as integral parts of the circuit.

The central component of the motor controller is relay 16 having switching contacts 17 connected in series between motor 10 and the positive side of battery 14. Motor 10 is connected directly to the negative side of battery 14. First energizing lead 18 of relay 16 is connected to the negative side of battery 14 and second energizing lead 20 of relay 16 is connected to contacts 17 on the side nearest motor 10 through resistor 21. Lead 20 is also connected to one electrode 22 of magnetic reed switch 24. Still a further connection to lead 20 is through resistor 25 to electrode 26 of magnetic reed switch 27. Electrode 28 on the other side of switch 27 is connected to the positive terminal of battery 14. Electrode 30 of switch 24 opposite electrode 22 is connected to the negative side of battery 14. Semiconductor diode 31 is connected across motor 10 with its cathode connected to the positive terminal. Permanent magnet 32 is positioned for movement between magnetic reed switches 24 and 27 and is connected to rudder actuator 34 which also is connected through linkage 35 to turn rudder 36. Rudder actuator 34 is controlled by radio receiver 37. Both receiver 37 and actuator 34 are provided with power by battery 38, but they may use power from battery 14 instead.

All of the components described above are mounted within the airplane and are responsive to remote control from radio transmitter 40.

In operation of the depicted embodiment, radio transmitter 40 is activated to provide a signal through receiver 37 and actuator 34 to turn rudder 36 to the left simultaneously swinging magnet 32 adjacent to magnetic reed switch 27. Induced magnetism in the elements of switch 27 close the contacts completing a circuit through the energizing coil of relay 16 to battery 14. This causes relay contacts 17 to close completing a circuit from motor 10 to battery 14 starting motor 10. Contact 17 also completes a circuit from battery 14 through resistor 21 to the energizing coil of relay 16.

Resistor 21 is selected to provide enough current to hold relay 16 energized only as long as battery 14 is within its normal operating voltage range. When the voltage of battery 14 drops below its normal operating range, the current flow through resistor 21 becomes inadequate to maintain relay 16 energized and contacts 17 open disconnecting battery 14.

Immediately after starting motor 10, transmitter 40 is controlled to bring rudder 36 back from the extreme left position to a normal steering position while the airplane is operated. When it is desired to turn motor 10 off, transmitter 40 is operated to cause rudder 36 to swing to the extreme right position simultaneously bringing magnet 32 adjacent magnetic reed switch 24. Switch 24 on closing, short circuits the energizing coil of relay 16 so that contacts 17 open disconnecting battery 14.

Diode 31, positioned across motor 10, protects contacts 17 against reactive transients by short circuiting reverse voltage swing.

While the invention has been described with respect to a specific embodiment, it is contemplated that it can be used in model boats and cars as well as airplanes. The on-off switching device may be connected with some actuator other than a steering actuator or it may be independently radio controlled. Relay 16 can be replaced by a solid state device, however, state of the art devices are generally either unreliable at the low voltages commonly used, require more control current, or both. Magnetic reed switches 24 and 27 could be replaced by other types of switches either fully mechanical micro switches or solid state switching devices responsive to magnetic, capacitive or even electrooptical fluctuations. With radio systems such as coded cw systems, a decoder readily provides signals for a plurality of functions from a single radio channel. Solid state switching devices responsive to the decoded signals can operate directly or activate a mechanical relay for motor control. Thus it is intended to claim the invention within the scope of the following claims.

I claim:

1. A motor controller for electrically driven models comprising:
   a. a relay connected in series between a connection for an electric driving motor and a connection for an electric energy source;
   b. first switching means for energizing said relay;
   c. second switching means for deenergizing said relay;
   d. a radio controlled actuating device for actuating a functional component of said model independent of said driving motor and having a range of operation intermediate first and second extremes; and
   e. switch activating means connected to said actuating device for activating said first switching means at said first extreme and for activating said second switching means at said second extreme.

2. A motor controller according to claim 1 wherein said relay is an electromagnetic relay having an energizing coil and said first switching means is connected between said connection for an electrical energy source and said coil and said second switching means is connected across said coil.

3. A motor controller according to claim 1 wherein said electrically driven models are model planes and said component is a rudder.

4. A motor controller according to claim 1 wherein said switch activating means is a magnet and said first and second switching means are magnetic reed switches.

5. A motor controller according to claim 2 in which operation of said relay connects said connection for an electrical energy source through an impedance to said energizing coil to provide holding current for said relay, said impedance characterized in that it reduces current to said energizing coil below holding level when the connected electrical energy source drops below its normal operating voltage range.

6. A motor controller according to claim 1 wherein said first and second switching means are devices that provide switching responsive to a radiated field.

7. In a radio controlled model plane system having a radio transmitter ground station, a mobile radio receiver, an operable rudder on said plane, an actuator for operating said rudder responsive to a control signal from said radio receiver, an electrical motor driven propeller for driving said plane, a battery for providing power to said electric motor, and a controller for connecting said battery to said electric motor, the combination in said controller comprising:
   a. an electromagnetic relay having contacts connected in series between said battery and said motor;
   b. an energizing coil for said relay;
   c. a first magnetic reed switch connected between said battery and said energizing coil;
   d. a second magnetic reed switch connected across the coil of said relay;
   e. a magnet positioned between said first and second magnetic reed switches and mechanically connected to said actuator for movement to activate said first switch and said second switch upon actuation of said rudder to a first extreme and to a second extreme respectively; and
   f. an impedance connected from the motor side of said relay contacts to said coil for providing holding current to said relay.

* * * * *